(12) United States Patent
Kiso et al.

(10) Patent No.: US 11,090,776 B2
(45) Date of Patent: Aug. 17, 2021

(54) AUTOMATIC TOOL CHANGER

(71) Applicant: HORKOS CORP, Hiroshima (JP)

(72) Inventors: Hiroaki Kiso, Fukuyama (JP); Kunihiro Ikeda, Fukuyama (JP)

(73) Assignee: HORKOS CORP, Hiroshima (JP)

( * ) Notice: Subject to any disclaimer, the term of this patent is extended or adjusted under 35 U.S.C. 154(b) by 196 days.

(21) Appl. No.: 16/461,303

(22) PCT Filed: Nov. 15, 2017

(86) PCT No.: PCT/JP2017/041039
§ 371 (c)(1),
(2) Date: May 15, 2019

(87) PCT Pub. No.: WO2018/092794
PCT Pub. Date: May 24, 2018

(65) Prior Publication Data
US 2019/0314944 A1 Oct. 17, 2019

(30) Foreign Application Priority Data

Nov. 16, 2016 (JP) .............................. JP2016-222840

(51) Int. Cl.
*B23Q 11/08* (2006.01)
*B23Q 3/157* (2006.01)
*B23Q 3/155* (2006.01)

(52) U.S. Cl.
CPC ...... *B23Q 3/15539* (2016.11); *B23Q 3/15526* (2013.01); *B23Q 3/15713* (2013.01);
(Continued)

(58) Field of Classification Search
CPC ............. Y10T 483/115; Y10T 483/175; Y10T 483/179–1798; Y10T 483/1845;
(Continued)

(56) References Cited

U.S. PATENT DOCUMENTS 4,601,094 A * 7/1986 Myers ................ B23Q 3/15539
483/3
9,993,902 B2 * 6/2018 Kanda ................ B23Q 11/0891
(Continued)

FOREIGN PATENT DOCUMENTS

FR 2907357 A1 * 4/2008 ......... B23Q 3/15533
JP 2002-283166 A 10/2002
(Continued)

*Primary Examiner* — Erica E Cadugan
*Assistant Examiner* — Michael Vitale
(74) *Attorney, Agent, or Firm* — Osha Bergman Watanabe & Burton LLP

(57) ABSTRACT

An automatic tool changer includes a cover that partitions a machining area and a non-machining area, and an opening/closing member that opens/closes an opening of the cover by turning in synchronization with rotation of a tool changer magazine. The opening/closing member includes a plate section partitions the machining area and the non-machining area at a position of the opening of the cover. In a case where the tool changer magazine performs tool replacement with respect to a tool storage magazine, the plate section closes the opening of the cover by taking a horizontal posture. In a case where the tool changer magazine performs tool replacement with respect to a main spindle, the plate section opens the opening of the cover by changing its posture from the horizontal posture to an inclined posture or a vertical posture.

6 Claims, 15 Drawing Sheets

(52) U.S. Cl.
CPC .......... *B23Q 11/08* (2013.01); *B23Q 3/15722* (2016.11); *B23Q 3/15724* (2016.11); *Y10T 483/115* (2015.01); *Y10T 483/1795* (2015.01); *Y10T 483/1882* (2015.01); *Y10T 483/1891* (2015.01)

(58) Field of Classification Search
CPC ......... Y10T 483/1855; Y10T 483/1873–1891; B23Q 11/08; B23Q 3/15539; B23Q 3/15706; B23Q 3/1572; B23Q 3/15722; B23Q 3/15724; B23Q 3/15753; B23Q 3/1576; B23Q 3/15766
USPC .................. 483/3, 37, 54–57, 63, 64, 66–68
See application file for complete search history.

(56) References Cited

U.S. PATENT DOCUMENTS

2018/0032052 A1\* 2/2018 Ishii .................... B23Q 11/0891
2018/0178301 A1\* 6/2018 Toyama ............. B23Q 3/15773

FOREIGN PATENT DOCUMENTS

| | | | | |
|---|---|---|---|---|
| JP | 2004-306185 A | \* | 11/2004 | ......... B23Q 3/15533 |
| JP | 2007-125642 A | | 5/2007 | |
| WO | WO-2016/135958 A1 | \* | 9/2016 | ............. G01M 1/14 |

\* cited by examiner

AUTOMATIC TOOL CHANGER

TECHNICAL FIELD

The present invention relates to an automatic tool changer of a machine tool, and relates, more particularly, to an automatic tool changer including a tool storage magazine for housing a large number of tools, and a tool changer magazine for transferring a tool in the tool storage magazine to a main spindle.

BACKGROUND ART

Conventionally, at a time of machining a workpiece having a complex shape, machining including many processes and requiring carrying-in, conveying and chucking the workpiece is performed by using machine tools that are different depending on machining details. However, in recent years, to increase productivity per installation area of a machine tool in a factory, there is an increasing demand to aggregate processes by completing machining in one loading/chucking. There is an increasing demand to aggregate processes also in the case of machining several types of workpieces of different dimensions and shapes, in addition to machining of workpieces of one type.

Methods used to handle machining of various types by one machine tool include a method of replacing a tool in a tool magazine manually by a worker each time the type of workpiece changes, and a method of enabling handling of several types of workpieces without manual work by using a large tool magazine. In the case of manually replacing a tool, because some tools are heavy, there is a problem with safety, and also, there are drawbacks that there is a possibility of human errors such as erroneous replacement, and that replacement of tools takes time.

Even in the case of using a large tool magazine, an area occupied by the tool magazine is desirably not too increased, from the standpoint of efficient use of installation space. Accordingly, as disclosed in Patent Literature 1, for example, there is proposed an automatic tool changer including, in addition to a main tool storage magazine, a tool storage sub-magazine for housing a smaller number of tools, so as to increase the number of tools to be housed without increasing the installation space. With this device, in the case of performing tool replacement of transferring a tool from the main tool storage magazine to a main spindle, first, a tool pot of the tool storage magazine is swiveled by 90 degrees, and then, a tool is drawn out from the main spindle by a swivel arm, and then, the swivel arm is swiveled by 180 degrees and a next tool is attached to the main spindle.

However, the swivel arm is arranged through an opening/closing member away from a machining region to prevent entering of chips produced during machining, and the swivel arm cannot swivel while the opening/closing member is closed, and thus a pre-operation for transfer of a tool to the main spindle cannot be performed. Furthermore, in a case where machining of a workpiece finishes in a short time, and it takes a longer time to cause the next tool to be held by the swivel arm from the main tool storage magazine, a wait time for tool replacement is caused, and a cycle time cannot be effectively reduced.

Accordingly, with an automatic tool changer disclosed in Patent Literature 2, a pre-operation up to transfer of a tool from a tool storage magazine to a main spindle is performed during machining so as to reduce a tool replacement time. Specifically, a V-shaped changing arm that rotates around a base of the V shape is adopted instead of a swivel arm that swivels by 180 degrees, and a cover is integrally disposed around the changing arm. This enables a part of operation for automatic tool replacement to be performed, as a preparatory operation, in parallel with machining of a workpiece by the main spindle, and a wait time for tool replacement in Patent Literature 1 to be reduced.

CITATIONS LIST

Patent Literature 1: JP 2007-125642 A
Patent Literature 2: JP 2002-283166 A

SUMMARY OF INVENTION

Technical Problems

The cover of the automatic tool changer in Patent Literature 2 is formed of a semicircular fixed outer peripheral cover that is provided near rotation tracks on which outer peripheral edges of tools held by two tool holding sections move at the time of swiveling of the V-shaped changing arm, and a substantially V-shaped cover body (hereinafter referred to as "V-shaped cover body") that is provided outside arm pieces holding the two tool holding sections, and that rotates integrally with the V-shaped changing arm in accordance with swiveling of the arm.

A top part of the semicircular fixed outer peripheral cover is positioned facing a tool that is at an indexing/replacement position of the tool storage magazine, and is provided with an opening. A wiper that comes into contact with an inner surface of the fixed outer peripheral cover is provided at a rotating tip end edge of the V-shaped cover body, and entering of chips and the like into a non-machining area through a gap between a tip end of the V-shaped cover body and the fixed outer peripheral cover is thereby prevented. During machining, the V-shaped cover body has to remain at a position within a range where the opening at an indexing/replacement position of the fixed outer peripheral cover can be blocked, such that the opening is not released. Accordingly, a standby position of the V-shaped changing arm has to be at a position separate from the main spindle, and the tool holding section of the V-shaped changing arm cannot be caused to stand by at a position closest to a tool replacement position of the main spindle. Hence, the V-shaped changing arm has to be greatly rotated by approximately 180 degrees at the time of performing tool replacement with respect to the main spindle. Furthermore, after the tool replacement is finished, the main spindle cannot start machining until the V-shaped cover body returns to a position within the range where the opening of the fixed outer peripheral cover can be blocked. Accordingly, the V-shaped changing arm has to rotate by approximately 180 degrees in each of clockwise and counterclockwise directions for tool replacement, and thus has to rotate by a total of about 360 degrees, and there is a limit to reduction in a cycle time for tool replacement.

The present invention aims to provide an automatic tool changer that is capable of further reducing a cycle time for tool replacement by bringing a tool holding section to a position closest to a tool replacement position of a main spindle during preparation before transfer of a tool to the main spindle.

Solution to Problems

An automatic tool changer of the present invention includes a tool storage magazine for storing a tool to be attached to a main spindle of a machine tool; a rotatable tool changer magazine for performing tool replacement with respect to the main spindle, and with respect to the tool storage magazine; a cover for partitioning a machining area (area where the tool changer magazine performs tool replacement with respect to the main spindle) and a non-machining area (area where the tool changer magazine performs tool replacement with respect to the tool storage magazine); an opening, provided at the cover, for enabling transfer of a tool between the tool changer magazine and the main spindle; and an opening/closing member for opening/closing the opening by turning in synchronization with rotation of the tool changer magazine. The opening/closing member includes a plate section for partitioning the machining area and the non-machining area at a position of the opening of the cover. In a case where the tool changer magazine performs tool replacement with respect to the tool storage magazine, the plate section closes the opening by taking a horizontal posture or a vertical posture. In a case where the tool changer magazine performs tool replacement with respect to the main spindle, the plate section opens the opening of the cover by changing a posture from the horizontal posture to an inclined posture or the vertical posture, or from the vertical posture to the inclined posture or the horizontal posture.

In a preferred embodiment of the present invention, the opening/closing member turns in synchronization with rotation of the tool changer magazine, only in a case where the tool changer magazine performs tool replacement with respect to the main spindle, and the opening/closing member does not turn in synchronization with rotation of the tool changer magazine, in a case where the tool changer magazine performs tool replacement with respect to the tool storage magazine.

In the present invention, switching means for switching between synchronization and asynchronization of the opening/closing member with respect to rotation of the tool changer magazine may be provided.

The switching means, for example, includes a pressing body section fixed to the tool changer magazine, and a pressed body section fixed to the opening/closing member. In this case, when the tool changer magazine performs tool replacement with respect to the main spindle, the pressing body section may come into contact with the pressed body section, and the opening/closing member may turn integrally with the tool changer magazine. When the tool changer magazine performs tool replacement with respect to the tool storage magazine, the pressing body section may separate from the pressed body section, and only the tool changer magazine may rotate and the opening/closing member do not have to turn.

The pressing body section is, for example, a cam follower including a roller and a shaft, and the pressed body section is, for example, a groove body including a groove where the cam follower is guided. In a preferred embodiment, a cut-away section allowing the cam follower to move in and out of is formed to the groove body. When the tool changer magazine performs tool replacement with respect to the main spindle, the cam follower moves in from the cut-away section and comes into contact with the groove body. When the tool changer magazine performs tool replacement with respect to the tool storage magazine, the cam follower is separated from the cut-away section and contact between the cam follower and the groove body is released.

In the present invention, one of the pressing body section and the pressed body section may include an electromagnet.

In this case, the pressing body section and the pressed body section come into contact with each other by an attractive force of the electromagnet.

Moreover, in the present invention, a rotation axis of the tool changer magazine and a rotation axis of the opening/closing member may be offset from each other.

Advantageous Effects of Invention

According to the present invention, in a case where the tool changer magazine performs tool replacement with respect to the tool storage magazine, the opening of the cover is kept closed by the opening/closing member, and a tool to be used in a next process may be prepared between the tool changer magazine and the tool storage magazine in parallel while the main spindle is performing machining, thereby a cycle time of tool replacement may be reduced. Furthermore, because the opening/closing member is not a V-shaped cover body as in Patent Literature 2, but includes the plate section for partitioning the non-machining area and the machining area at the position of the opening of the cover, the tool changer magazine may be made to stand by in the non-machining area while being closest to the main spindle, and a cycle time of tool replacement with respect to the main spindle may be reduced as much as possible.

DESCRIPTION OF EMBODIMENTS

Figure 1:
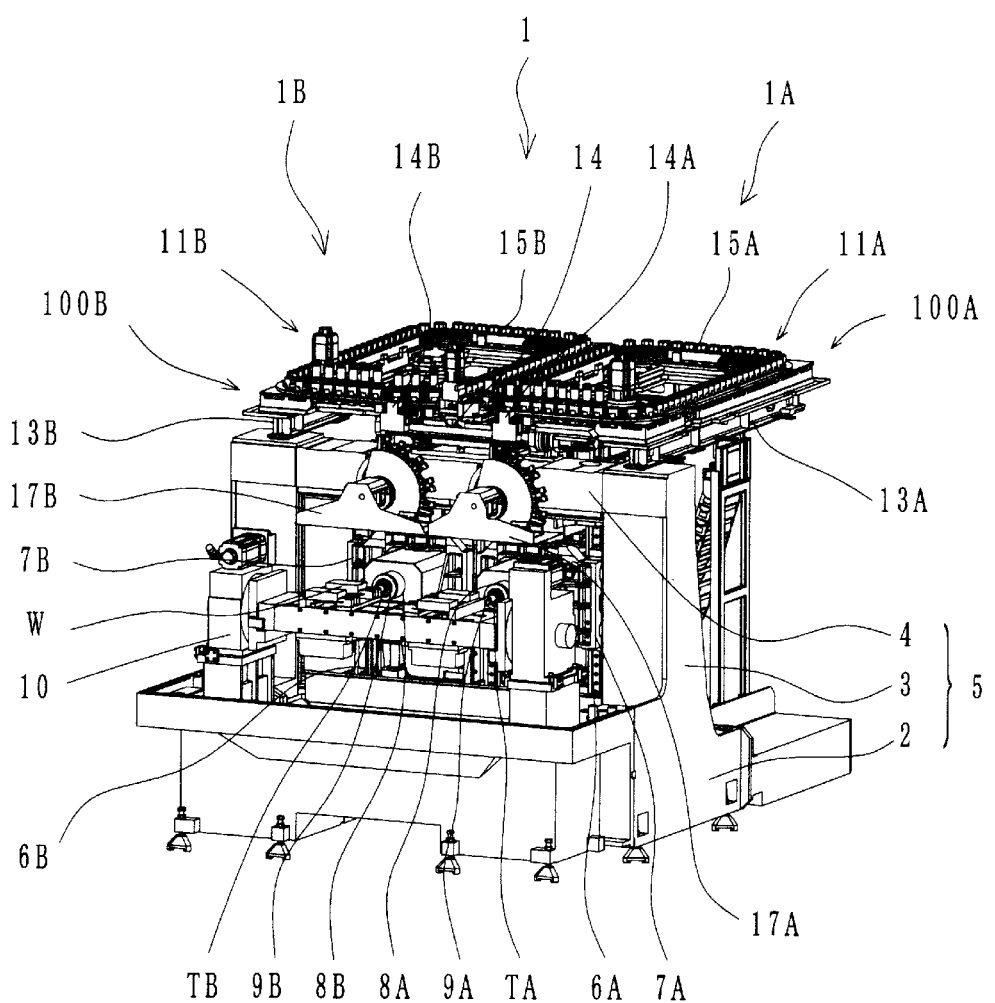
FIG. 1 is a perspective view showing a machine tool including an automatic tool changer according to a first embodiment of the present invention.
Figure 2:
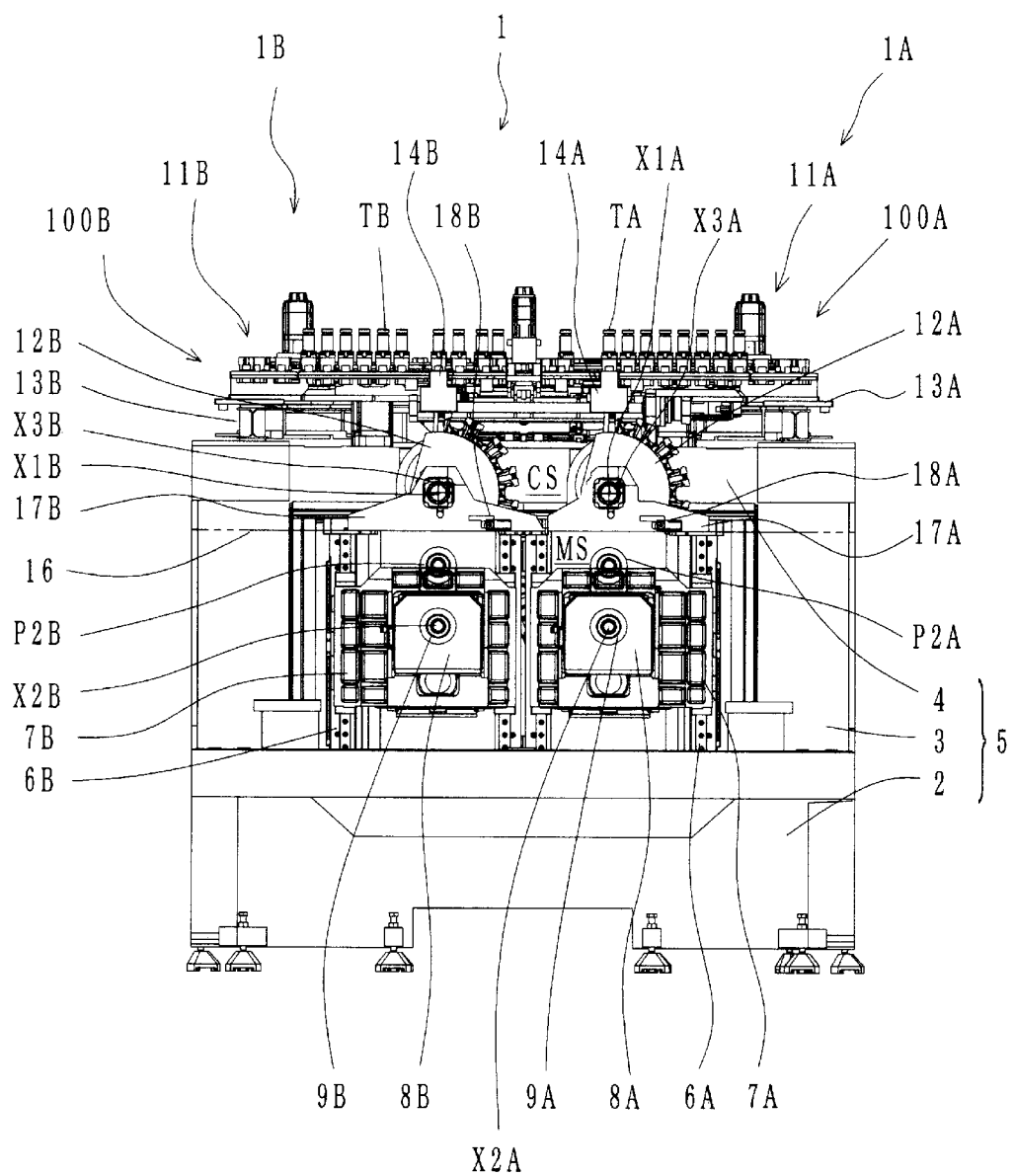
FIG. 2 is a front view of the machine tool in FIG. 1.

A machine tool 1 including automatic tool changers 100A, 100B according to a first embodiment of the present invention will be described with reference to FIGS. 1 and 2. In the following, a machine tool 1 including two main spindles is cited as an example. FIG. 1 is a perspective view showing the entire machine tool 1, and FIG. 2 is a front view of the machine tool 1. The machine tool 1 includes a column bed 5 as a structural body. The column bed 5 includes a bed section 2, two column sections 3 vertically provided on both of left and right ends of the bed section 2, and a cross beam section 4 extending between upper portions of the two column sections 3. Two first saddles 6A, 6B are provided at a rear portion of the bed section 2 in a manner capable of moving in an X-axis direction (left-right direction in FIG. 2). Second saddles 7A, 7B are provided on front surfaces of the first saddles 6A, 6B, respectively, in a manner capable of moving in a Y-axis direction (top-bottom direction in FIG. 2). Main spindle heads 8A, 8B are supported by the second saddles 7A, 7B in a manner capable of moving in a Z-axis direction (front-back direction perpendicular to the plane of FIG. 2). Main spindles 9A, 9B where tools TA, TB are to be attached at tip ends are rotatably embedded in the main spindle heads 8A, 8B. A table 10 for fixing a workpiece W is provided in front of the column bed 5.

Next, a description will be given of the automatic tool changers 100A, 100B. Rotatable tool changer magazines 12A, 12B for transferring tools TA, TB between the tool storage magazines 11A, 11B and the main spindles 9A, 9B are provided at the cross beam section 4 of the column bed 5. The tool storage magazines 11A, 11B are disposed on rectangular frame support bodies 13A, 13B that are horizontally fixed (in parallel with an XZ plane) on upper portions of the column sections 3 and the cross beam section 4 of the machine tool 1. Tool pot swiveling means for transferring a tool T between the tool storage magazine 11A, 11B and the tool changer magazine 12A, 12B is provided on the upper portion of the cross beam section 4. The tool pot swiveling means includes tool pot swiveling sections 14A, 14B each provided at a position corresponding to an indexing/replacement position (i.e., P1A, P1B in FIG. 8) where a tool pot 15A, 15B is transferred between the tool storage magazine 11A, 11B and the tool changer magazine 12A, 12B.

In FIGS. 1 and 2, a right half of the column bed 5, which is one structural body, will be referred to as "machine tool 1A", and a left half as "machine tool 1B", for the sake of convenience, and a detailed description will be given below with respect to the automatic tool changer 100A on the machine tool 1A side.

The tool storage magazine 11A of the automatic tool changer 100A is a rectangular rotary magazine that connects a large number of tool pots 15A by an endless chain to cause the tool pots 15A to move around along a rectangular rail (not shown) provided on the rectangular frame 13A by a known method. The magazine 11A rotates on a horizontal plane (XZ plane), indexes the tool TA, and transfers the tool pot 15A to the tool changer magazine 12A. At the time of rotation of the tool storage magazine 11A, the tool pot 15A holds the tool TA in a state where a rotation axis of the tool TA is vertical (in a state where the tool TA is upright while facing upward). This is for housing as many tools TA as possible, and for reducing an installation space of the tool storage magazine 11A as much as possible. Although depending on a size of the machine tool 1, the tool storage magazine 11A of the present example may house 70 tools TA (i.e., the machine tool 1 may house 140 tools TA, TB).

A reference sign 16 shown in FIG. 2 is a cover that functions as a partition plate for partitioning a machining area MS where machining of a workpiece is performed by the main spindle 9A, 9B, and a non-machining area CS where the tool storage magazine 11A and the tool changer magazine 12A are installed. The cover 16 is for preventing entering of cutting agents and chips produced in the machining area MS into the non-machining area CS, and is provided in common for the machine tools 1A, 1B. An opening 16a (see FIG. 7) for enabling transfer of the tool TA, TB between the tool changer magazine 12A, 12B and the main spindle 9A, 9B is provided at the cover 16. The opening 16a may be freely opened/closed by an opening/closing member 17A, 17B described later.

Figure 3:
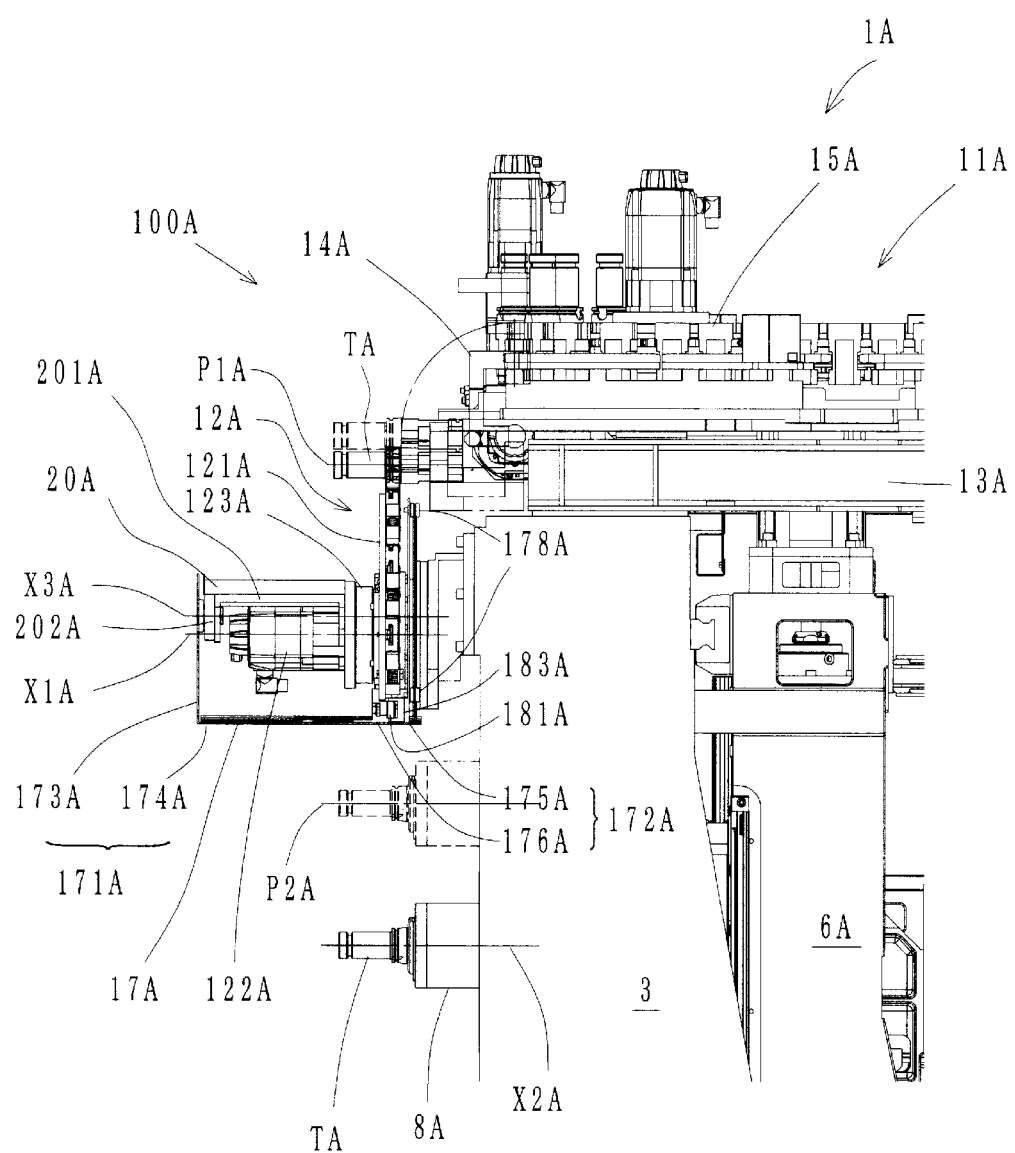
FIG. 3 is a side view of main sections of the machine tool in FIG. 1.

FIG. 3 is a side view of the machine tool 1A, and shows a part corresponding to the automatic tool changer 100A in an enlarged manner. When the tool storage magazine 11A rotates, and the tool pot 15A housing the tool TA to be used in a next process is positioned at the indexing/replacement position P1A, the tool pot 15A is transferred to the tool pot swiveling section 14A, the tool pot swiveling section 14A is swiveled by 90 degrees, and the rotation axis of the tool TA is horizontally maintained in parallel with a rotation axis X2A of the main spindle 9A. A tool holding section (HaA, . . . , HdA in FIG. 4) of the tool changer magazine 12A is positioned directly below the tool TA, and the tool pot swiveling section 14A is lowered such that a flange portion of the tool TA is held by a claw portion of the tool holding section. As a result, the flange portion of the tool TA is held by the tool holding section of the tool changer magazine 12A by a known method, and a shank portion of the tool TA is unclamped from the tool pot 15A. When transfer of the tool TA is performed, the tool pot swiveling section 14A is retracted, raised, and is swiveled to return the empty tool pot 15A to the tool storage magazine 11A.

Figure 4:
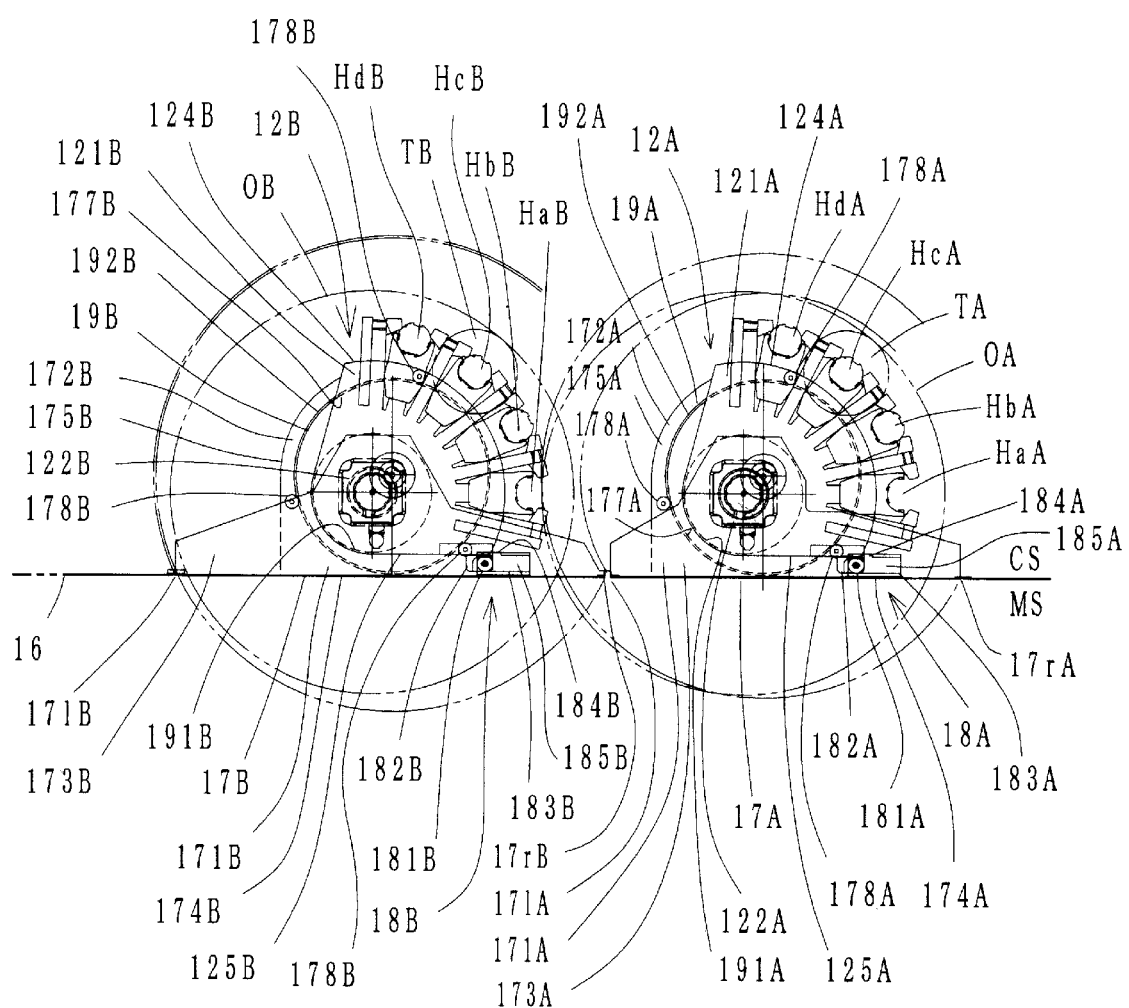
FIG. 4 is a front view of opening/closing members for a tool changer magazine.
Figure 5:
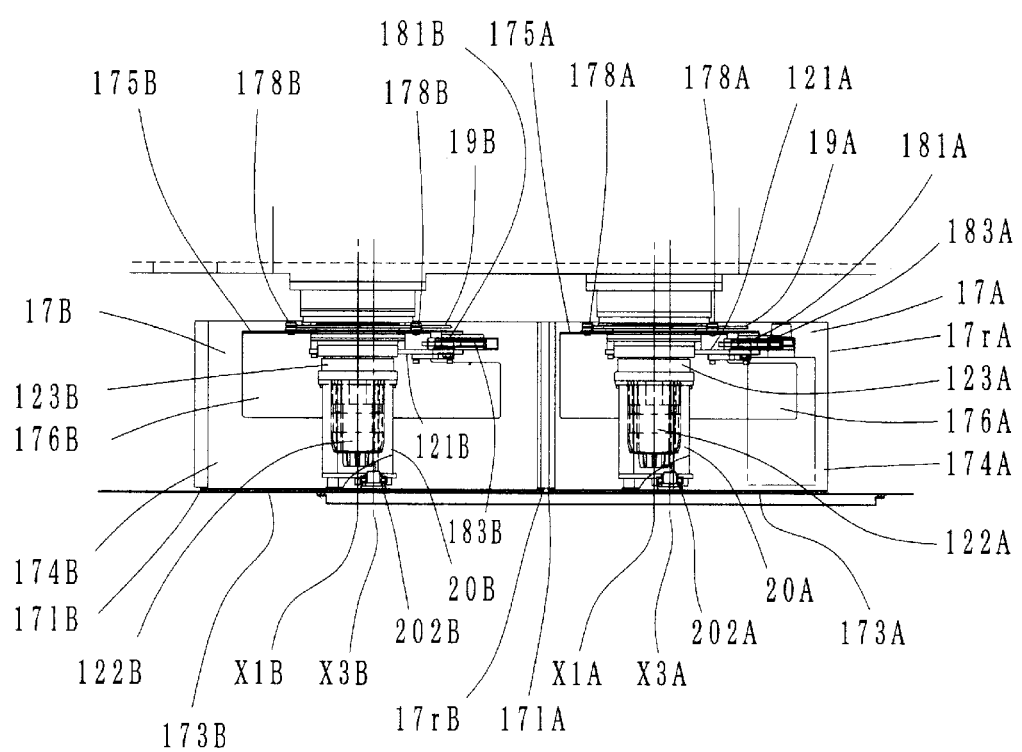
FIG. 5 is a plan view of the opening/closing members for the tool changer magazine.

Next, a function of the opening/closing member 17A, 17B will be described. FIG. 4 is a front view of the opening/closing members 17A, 17B, and FIG. 5 is a plan view of the opening/closing members 17A, 17B. When the tool changer magazine 12A, 12B rotates to perform transfer the tool TA, TB with respect to the main spindle 9A, 9B, the opening/closing member 17A, 17B turns in synchronization with rotation of the tool changer magazine 12A, 12B to achieve a state where the opening 16a of the cover 16 is open (see FIG. 7). Furthermore, when the tool changer magazine 12A, 12B is to perform transfer the tool with respect to the tool storage magazine 11A, 11B by the tool pot swiveling section 14A, 14B, the opening/closing member 17A, 17B maintains a state where the opening 16a of the cover 16 is closed, without turning in synchronization with rotation of the tool changer magazine 12A, 12B (see FIG. 8). That is, the opening/closing member 17A, 17B functions as a shutter that opens or closes the opening 16a of the cover 16.

Figure 6:
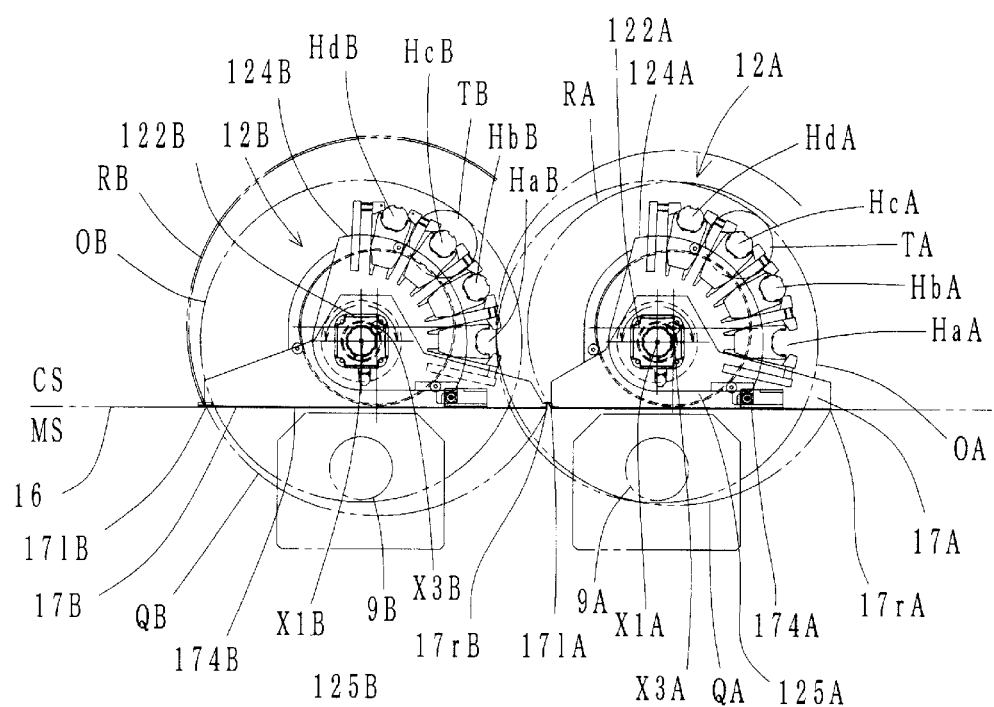
FIG. 6 is a diagram showing a state where the tool changer magazine is at an origin position.

Operations of the tool changer magazines 12A, 12B and the opening/closing members 17A, 17B will be described in detail, citing the tool changer magazine 12A and the opening/closing member 17A on the machine tool 1A side as examples. As shown in FIG. 4, the tool changer magazine 12A includes a fan-shaped disc body 121A, and is rotatably fixed to a rotary section of a reducer 123A (see FIG. 5) for controlling a rotational speed of a rotary motor 122A. Four tool holding sections HaA, HbA, HcA, HdA are radially arranged around a rotation axis X1A (see FIG. 6), on an arc section 124A of the disc body 121A. The rotation axis X1A is a common rotation axis of the rotary motor 122A and the reducer 123A, and is parallel with and on a same vertical plane (YZ plane) as the rotation axis X2A of the main spindle 9A, as shown in FIGS. 2 and 3. Additionally, FIGS. 4 and 6 show a state where the tool changer magazine 12A is at an origin position.

Figure 13:
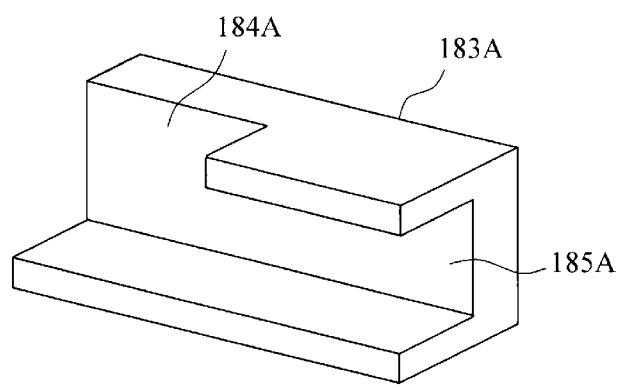
FIG. 13 is a diagram showing detailed structures of the cam follower and a groove body.
Figure 13:
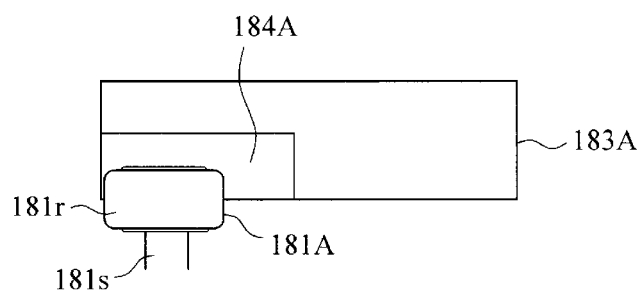
Figure 13:
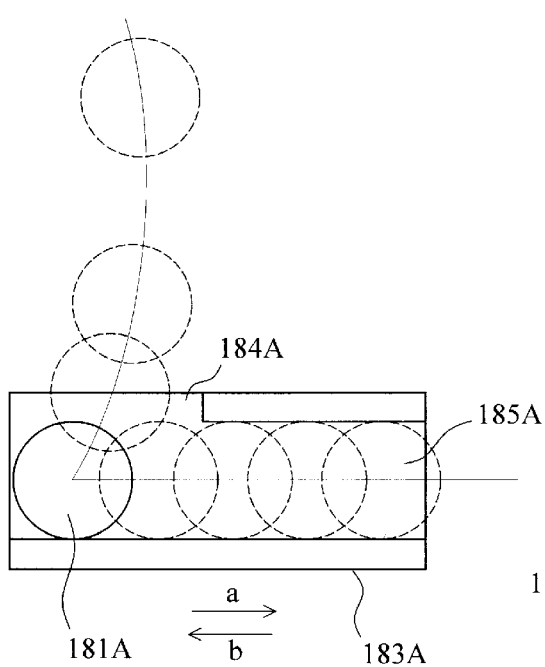
Figure 13:
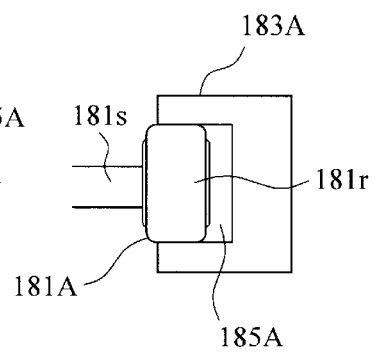

A reference sign 18A in FIG. 2 is a cam mechanism that includes, as shown in FIG. 4, a cam follower 181A, a cam follower holding section 182A for holding the cam follower 181A, and a groove body 183A for guiding the cam follower 181A. Each section of the cam mechanism 18A should be correctly illustrated by a dashed line, but in FIG. 4, each section is illustrated by a solid line in order to show the structure clearly. Structures of the cam follower 181A and the groove body 183A are shown in FIG. 13 described later. In FIG. 4, the cam follower holding section 182A is fixed to a side section 125A of the disc body 121A of the tool changer magazine 12A, in parallel with the opening/closing member 17A. As shown in FIG. 3, the groove body 183A is fixed inside the opening/closing member 17A. As shown in FIG. 4, a cut-away section 184A is provided on an upper portion of the groove body 183A, on the tool changer magazine 12A side (left side in FIG. 4) (see also FIG. 13). When the tool changer magazine 12A is at the origin position (state shown in FIG. 4), the cam follower 181A is at the position of the cut-away section 184A of the groove body 183A, and is in contact with the groove body 183A. The cam mechanism 18A is an example of "switching means" of the present invention, the cam follower 181A is an example of "pressing body section" of the present invention, and the groove body 183A is an example of "pressed body section" of the present invention.

Figure 12:
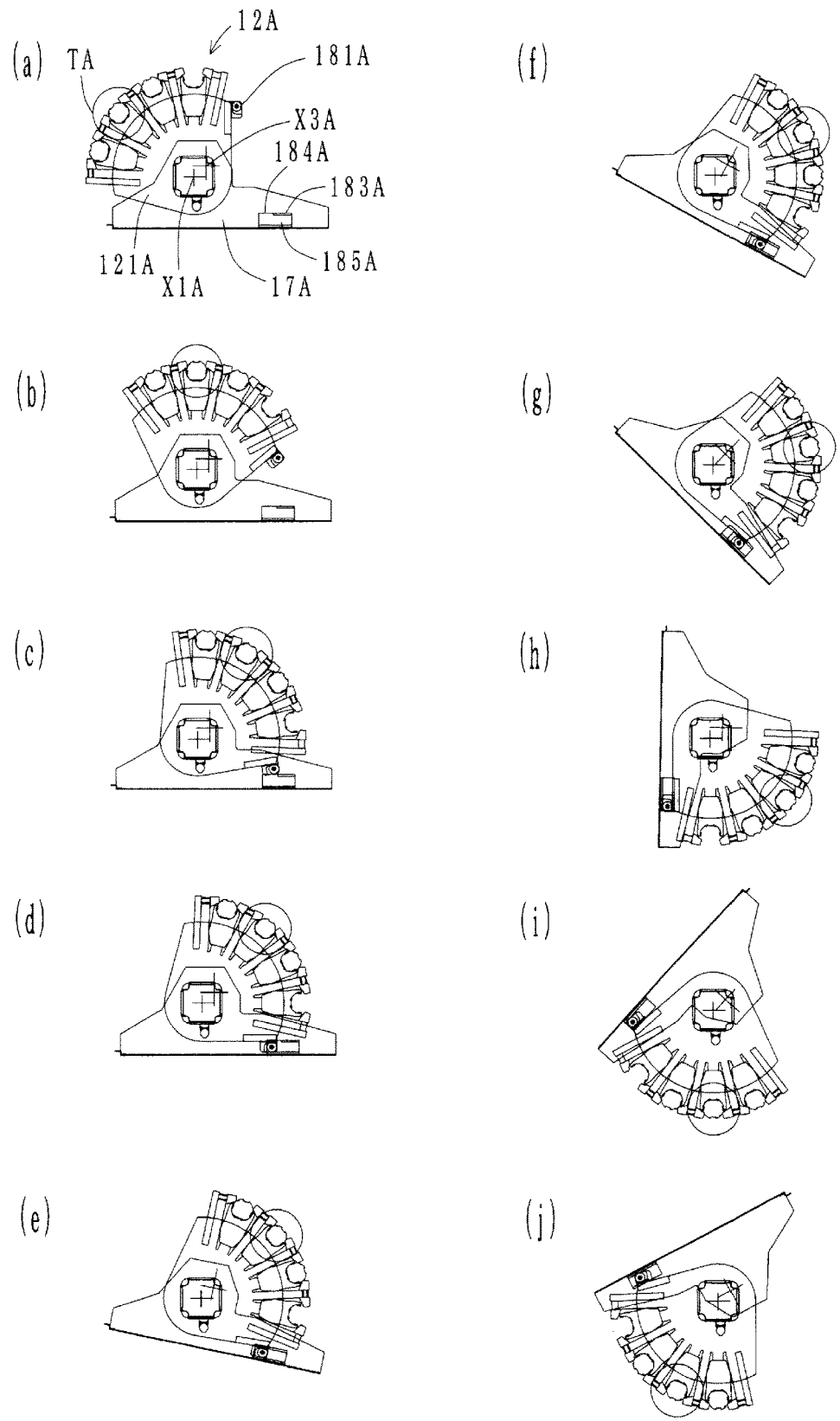
FIG. 12 is a diagram showing displacement of a cam follower caused by rotation of a tool changer magazine.

FIG. 12 is a diagram showing the manner of displacement of the cam follower 181A caused by rotation of the tool changer magazine 12A. For the sake of convenience, a reference sign of each section is omitted in (b) to (j). When the tool changer magazine 12A rotates clockwise from the position in (a) in a manner shown in (b), the cam follower 181A reaches the cut-away section 184A of the groove body 183A at the position in (c), and comes into contact with the groove body 183A at the position in (d). When the tool changer magazine 12A further rotates clockwise from this state, a rotational force of the tool changer magazine 12A is transmitted to the opening/closing member 17A through the cam follower 181A and the groove body 183A, and the opening/closing member 17A turns clockwise in synchronization with the rotation of the tool changer magazine 12A. In this case, as shown in (e) to (j), a contact point of the cam follower 181A and the groove body 183A changes according to a rotation angle of the tool changer magazine 12A. This is because, as shown in (a), a rotation axis X3A of the opening/closing member 17A to which the groove body 183A is fixed is offset from the rotation axis X1A of the disc body 121A to which the cam follower 181A is fixed. Movement of the cam follower 181A when the tool changer magazine 12A rotates counterclockwise is performed in the opposite manner, as shown in (j) to (a). The tool changer magazine 12B and the opening/closing member 17B on the machine tool 1B side operate in the same manner as in FIG. 12.

FIG. 13 shows detailed structures of the cam follower 181A and the groove body 183A, wherein A is a perspective view, B is a plan view, C is a front view, and D is a right side view. The groove body 183B on the machine tool 1B side is structured in the same manner. The groove body 183A includes a groove 185A where the cam follower 181A is guided. The cut-away section 184A where the cam follower 181A can move in and out of is formed to the groove body 183A. The cam follower 181A has a known structure including a roller 181r and a shaft 181s. A vertical width of the groove 185A is approximately the same as a diameter of the roller 181r of the cam follower 181A, and as shown in C, D of FIG. 13, the cam follower 181A is displaced with the roller 181r in contact with top and bottom walls of the groove 185A. In FIG. 13C, the groove body 183A is shown to be at a fixed position for the sake of convenience, but in reality, the groove body 183A rotates together with the opening/closing member 17A, and the position of the groove body 183A is changed, as shown in FIG. 12. In the present embodiment, an example is described where the pressing body section is formed by the cam follower 181A, and the pressed body section is formed by the groove body 183A, but a shaft and a bearing may be used instead, and the pressing body section may be formed by the shaft, and the pressed body section may be formed by the bearing.

In the case where the tool TA is to be transferred between the tool changer magazine 12A and the main spindle 9A, the tool changer magazine 12A is rotated in a clockwise arrow direction around the rotation axis X1A in FIG. 6. In this case, in FIG. 13C, the cam follower 181A enters from the cut-away section 184A, comes into contact with the groove body 183A, moves in a direction of an arrow a, and is displaced by being guided by the groove 185A. As a result, the opening/closing member 17A turns in the clockwise direction, integrally with the tool changer magazine 12A.

On the other hand, in the case where the tool changer magazine 12A performs transfer of the tool TA with respect to the tool storage magazine 11A by the tool pot swiveling section 14A, the tool changer magazine 12A rotates in a counterclockwise arrow direction around the rotation axis X1A in FIG. 6. In this case, in FIG. 13C, the cam follower 181A moves inside the groove 185A of the groove body 183A in a direction of an arrow b, and after reaching a left end position, the cam follower 181A is separated from the cut-away section 184A in accordance with rotation of the tool changer magazine 12A. Contact between the cam follower 181A and the groove body 183A is thereby released. As a result, the opening/closing member 17A does not turn in synchronization with the tool changer magazine 12A, and a state where the opening 16a of the cover 16 is closed is maintained. The tool changer magazine 12B and the opening/closing member 17B on the machine tool 1B side operate in the same manner as those on the machine tool 1A side.

As described above, in the present embodiment, synchronization/asynchronization of the opening/closing member 17A with respect to rotation of the tool changer magazine 12A is switched based on contact/separation of the cam follower 181A and the groove body 183A. Accordingly, by causing the cam follower 181A to come into contact with the groove body 183A and causing the opening/closing member 17A to be synchronous with rotation of the tool changer magazine 12A at the time of tool replacement between the tool changer magazine 12A and the main spindle 9A, it becomes unnecessary to separately provide a power source for driving the opening/closing member 17A. The same can be said for the machine tool 1B side.

In the machine tool 1 described above, to reduce the installation space as much as possible, a gap between the rotation axes X2A, X2B of the main spindles 9A, 9B in the X-axis direction (left-right direction) is set to a minimum distance required as a movement range of the main spindles 9A, 9B in the X-axis direction in FIG. 2. A gap between the rotation axes X1A, X1B of the tool changer magazines 12A, 12B in the X-axis direction is set in the same manner as the gap between the main spindles 9A, 9B in the X-axis direction.

However, as can be seen in FIG. 6, a total of radii of tracks OA, OB where outer peripheral edges of the tools TA, TB move when the tools TA, TB are held by the tool holding sections of the tool changer magazines 12A, 12B and the tool changer magazines 12A, 12B are rotated around the rotation axes X1A, X1B is greater than the gap between the main spindles 9A, 9B in the X-axis direction. Accordingly, at the time of rotation of the tool changer magazines 12A, 12B, consideration has to be given to rotation angles so that the tool changer magazines 12A, 12B do not interfere with each other. Normally, control is performed in such a way that the tool changer magazines 12A, 12B are rotated in synchronization with each other or at a same rotation angle, and there is no concern regarding interference between the tool changer magazines 12A, 12B. Even if the tool changer magazines 12A, 12B are not rotated in synchronization with each other, a shift between angles is acceptable as long as the shift is in a range that does not cause interference.

As shown in FIG. 6, the rotation axis X3A, X3B of the opening/closing member 17A, 17B, which turns in synchronization with rotation of the motor 122A, 122B, is parallel to the rotation axis X1A, X1B of the motor 122A, 122B, but is shifted to a position that is diagonally upward and rightward of the rotation axis X1A, X1B in a plan view. That is, the rotation axis X3A, X3B of the opening/closing member 17A, 17B is offset from the rotation axis X1A, X1B of the motor 122A, 122B. This is for preventing the opening/closing members 17A, 17B from interfering with each other.

Next, a structure of the opening/closing member 17A will be described (same applies to a structure of the opening/closing member 17B). As shown in FIG. 3, the opening/closing member 17A includes a front cover 171A covering a front portion of the tool changer magazine 12A, and a rear cover 172A rotatably provided at a position behind the disc body 121A of the tool changer magazine 12A. The front cover 171A includes a plate section 173A covering a front of the motor 122A, and a plate section 174A covering the entire tool changer magazine 12A from below (see also FIG. 5), and is formed into an L shape in a side view. The rear cover 172A includes a plate section 175A provided on a side of the reducer 123A, and a plate section 176A covering a bottom portion of the tool changer magazine 12A (see also FIG. 5), and is formed into an L shape in a side view. As shown in FIG. 5, the plate section 174A of the front cover 171A and the plate section 176A of the rear cover 172A are partially overlapped with each other, and the two are fixed by a screw or the like. In the following, for the sake of convenience, the two plate sections 174A, 176A will be collectively referred to as the plate section 174A, and the two plate sections 174B, 176B will be collectively referred to as the plate section 174B in the same manner. The plate section 174A takes a horizontal posture as shown in FIG. 6, a vertical posture as shown in FIG. 7A, or inclined postures as shown in FIGS. 7B to 7D, depending on the rotation angle of the opening/closing member 17A. In the present example, the plate sections 174A, 174B are flat plate members, but the plate members do not have to be completely flat, and may be slightly bent, for example. Furthermore, the plate sections 174A, 174B do not have to be completely horizontal when taking the horizontal posture, and may be inclined by a predetermined angle (such as 5 degrees to 20 degrees) with respect to a horizontal plane. In the same manner, the plate sections 174A, 174B do not have to be completely vertical when taking the vertical posture, and may be inclined by a predetermined angle (such as 5 degrees to 20 degrees) with respect to a vertical plane. The same applies to other embodiments described later.

A reference sign 19A in FIGS. 4 and 5 is a guide rail that is fixed to the reducer 123A. The guide rail 19A is a circular disc having the rotation axis X3A of the opening/closing member 17A at its center, and a circular hole 191A having the rotation axis X1A of the motor 122A at its center is formed to the circular disc. The guide rail 19A is fixed to the reducer 123A in a manner incapable of rotating, by inserting the motor 122A in the hole 191A and screwing an outer peripheral portion of the hole 191A to a fixing portion of the reducer 123A. The plate section 175A of the rear cover 172A is positioned on a front surface side of the guide rail 19A (FIG. 5), and a circular hole 177A having the rotation axis X3A of the opening/closing member 17A at its center is provided at the plate section 175A (FIG. 4). A diameter of the hole 177A is slightly smaller than a diameter of the guide rail 19A. The cam follower 178A is screwed to a rear surface side of the plate section 175A at three positions of an outer peripheral portion of the hole 177A (FIG. 5), and the cam follower 178A is disposed to be along an outer peripheral edge 192A of the guide rail 19A (FIG. 4).

A reference sign 20A in FIG. 3 is a motor cover that is fixed to the fixing portion of the reducer 123A. A bearing 202A having the rotation axis X3A of the opening/closing member 17A at its center is held at a tip end of a bracket section 201A of the motor cover 20A. The bearing 202A is fixed to the plate section 173A of the front cover 171A of the opening/closing member 17A, and rotatably supports the opening/closing member 17A. The opening/closing member 17A is supported at both of front and rear sides by the bearing 202A fixed to the plate section 173A of the front cover 171A and the cam follower 178A of the plate section 175A of the rear cover 172A that is engaged with the outer peripheral edge 192A of the guide rail 19A, and thus, bending moment is not easily generated, and the opening/closing member 17A turns stably.

Figure 7:
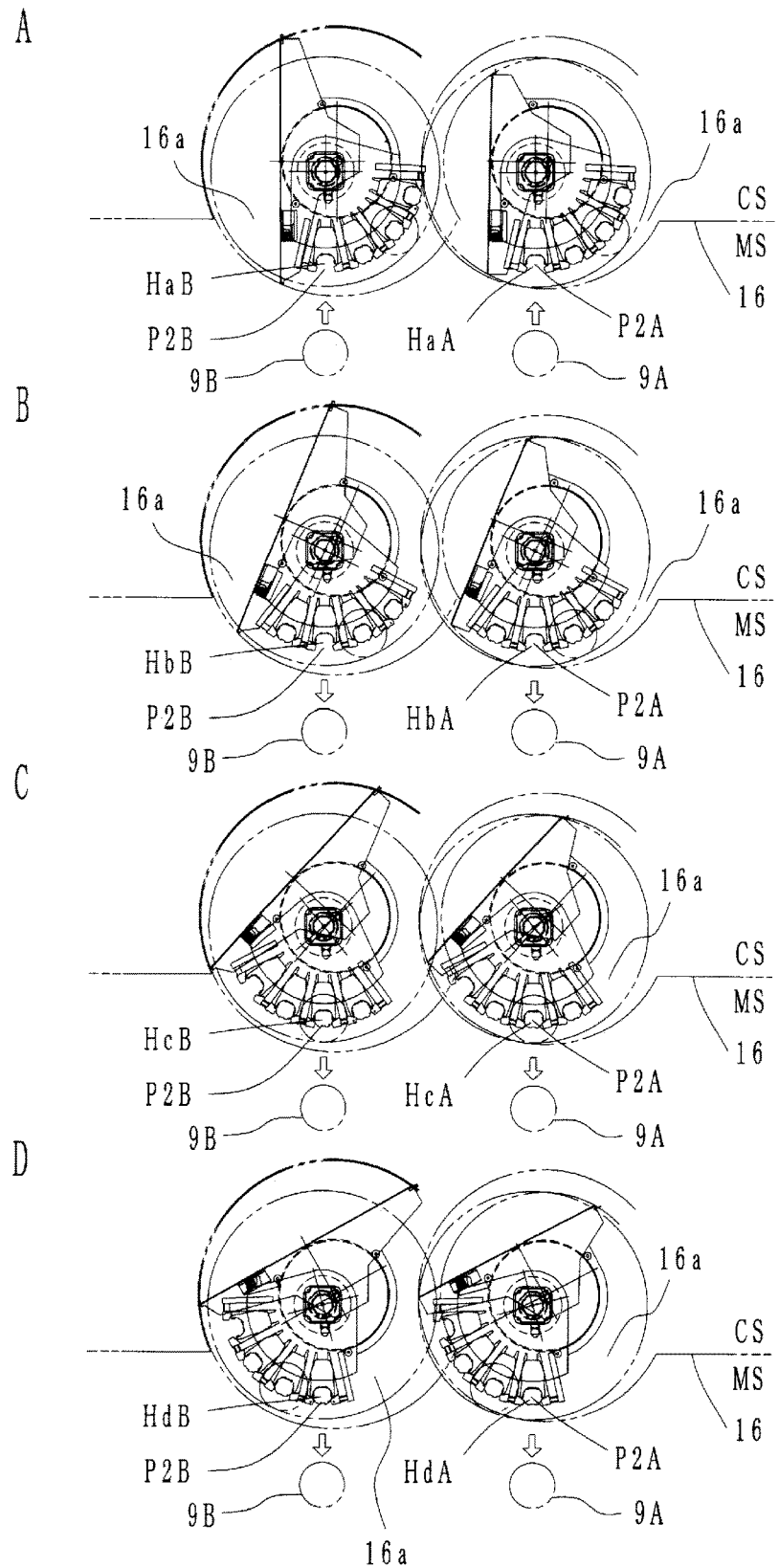
FIG. 7 is a diagram showing a case where the tool changer magazine rotates in a machining area.

The groove body 183A of the cam mechanism 18A described above is fixed at a lower right portion of the plate section 175A of the rear cover 172A. When the tool changer magazine 12A rotates clockwise to perform transfer of the tool TA with respect to the main spindle 9A, the cam follower 181A fixed to the disc body 121A comes into contact with the groove body 183A, and thus, the rear cover 172A turns clockwise integrally with the disc body 121A. Therefore, the front cover 171A that is joined to the rear cover 172A also rotates integrally with the rear cover 172A. That is, the opening/closing member 17A turns integrally with the tool changer magazine 12A. Then, when the plate section 174A of the opening/closing member 17A takes the horizontal posture as shown in FIG. 6, the opening 16a (FIG. 7) of the cover 16 is closed, and when the plate section 174A is displaced from the horizontal posture to the vertical posture or the inclined posture as shown in FIG. 7, the opening 16a of the cover 16 is opened.

In the case of performing transfer of the tool TA with respect to the main spindle 9A, the tool changer magazine 12A rotates clockwise, but after the tool TA is transferred, the tool changer magazine 12A is to return to the origin position, and thus, rotation is also performed in the counterclockwise direction. Accordingly, for the sake of convenience, clockwise and counterclockwise rotation of the tool changer magazine 12A at the time of tool transfer with respect to the main spindle 9A will be referred to as "machining area rotation".

On the other hand, in the case where transfer of the tool TA is to be performed between the tool changer magazine 12A and the tool storage magazine 11A, the disc body 121A of the tool changer magazine 12A rotates counterclockwise. In this case, the cam follower 181A is separated from the cut-away section 184A of the groove body 183A, and contact with the groove body 183A is released, and thus, the opening/closing member 17A maintains the opening 16a (FIG. 7) of the cover 16 in a closed state. At this time, the plate section 174A of the opening/closing member 17A is positioned at the opening 16a while taking the horizontal position as shown in FIG. 6, and partitions the machining area MS and the non-machining area CS at this position.

In the case of performing transfer of the tool TA with respect to the tool storage magazine 11A, the tool changer magazine 12A rotates counterclockwise, but after the tool TA is transferred, the tool changer magazine 12A is to return to the origin position, and thus, rotation is also performed in the clockwise direction. Accordingly, for the sake of convenience, clockwise and counterclockwise rotation of the tool changer magazine 12A at the time of tool transfer with respect to the tool storage magazine 11A will be referred to as "non-machining area rotation".

Although not shown, a stopper mechanism or the like may be provided for the opening/closing member 17A to maintain the opening 16a of the cover 16 in the closed state when the tool changer magazine 12A performs non-machining area rotation.

Next, the significance of setting the rotation axis X3A, X3B of the opening/closing member 17A, 17B to be offset from the rotation axis X1A, X1B of the tool changer magazine 12A, 12B will be described with FIG. 6 and FIG. 7. FIG. 6 is a diagram showing a state where the tool changer magazine 12A, 12B is at the origin position. FIG. 7 is a diagram showing a case where the tool changer magazine 12A, 12B rotates in the machining area. FIG. 7A is a diagram of a state where the tool holding section HaA, HaB is at a tool indexing/replacement position P2A, P2B with respect to the main spindle 9A, 9B. FIG. 7B is a diagram of a state where the tool holding section HbA, HbB is at the tool indexing/replacement position P2A, P2B with respect to the main spindle 9A, 9B. FIG. 7C is a diagram of a state where the tool holding section HcA, HcB is at the tool indexing/replacement position P2A, P2B with respect to the main spindle 9A, 9B. FIG. 7D is a diagram of a state where the tool holding section HdA, HdB is at the tool indexing/replacement position P2A, P2B with respect to the main spindle 9A, 9B. In the following, the reference signs HaA to HdA will be collectively indicated by HA, and the reference signs HaB to HdB will be collectively indicated by HB.

As shown in FIG. 6, a length in the left-right direction (hereinafter "left-right width") is different between the plate section 174A of the opening/closing member 17A and the plate section 174B of the opening/closing member 17B, and the left-right width of the plate section 174A is shorter than the left-right width of the plate section 174B. The reference sign OA, OB in FIG. 6 is a track where the outer peripheral edge of the tool TA, TB moves when the tool TA, TB is held by the tool holding section HA, HB. A center of the track OA, OB is the rotation axis X1A, X1B of the tool changer magazine 12A, 12B. Furthermore, a reference sign QA, QB is a track where a lower right end portion 17rA, 17rB of the opening/closing member 17A, 17B moves, and a reference sign RA, RB is a track where a lower left end portion 17lA, 17lB of the opening/closing member 17A, 17B moves. Centers of the track QA, QB and the track RA, RB is the rotation axis X3A, X3B of the opening/closing member 17A, 17B, and is offset to a position which is upward and rightward by about 45 degrees from the rotation axis X1A, X1B of the tool changer magazine 12A, 12B.

As shown in FIG. 6, a position of the lower left end portion 17lA of the opening/closing member 17A is set to a position that does not interfere with the track OB where the outer peripheral edge of the tool TB held by the tool holding section HB of the tool changer magazine 12B moves. A position of the lower right end portion 17rB of the opening/closing member 17B is determined based on the position of the lower left end portion 17lA of the opening/closing member 17A, and in the present example, the lower right end portion 17rB of the opening/closing member 17B slightly overlaps with the lower left end portion 17lA of the opening/closing member 17A in the left-right direction. The end portions 17lA, 17rB are overlapped with each other for the reason of not creating a gap through which chips may enter, and suppressing rotation of the opening/closing members 17A, 17B in cooperation with each other. However, causing the end portions 17lA, 17rB to overlap with each other is not the only means, and other structures may also be adopted as long as the object described above is achieved.

Moreover, a position of the lower left end portion 17lB of the opening/closing member 17B is set to a limit position that does not interfere with the track OB where the outer peripheral edge of the tool TB held by the tool holding section HB of the tool changer magazine 12B moves, and that does not interfere with the track QB where the lower right end portion 17rB of the opening/closing member 17B moves. As shown in FIG. 6, the rotation axis X3B of the opening/closing member 17B is offset diagonally upward and rightward from the rotation axis X1B of the tool changer magazine 12B, and thus, in the case where the opening/closing member 17B rotates by 180 degrees clockwise, the track QB where the lower right end portion 17rB moves becomes approximately the same as the track OB where the outer peripheral edge of the tool TB moves. In a case where the rotation axis X3B of the opening/closing member 17B is not offset, the position of the lower left end portion 17lB of the opening/closing member 17B is shifted to the left from the position in FIG. 6, but because the rotation axis X3B is offset, the position of the lower left end portion 17lB may be set rather to the right.

Now, by setting the position of the lower right end portion 17rA of the opening/closing member 17A to a limit position that does not interfere with the track OA where the outer peripheral edge of the tool TA held by the tool holding section HA of the tool changer magazine 12A moves, the left-right width of the plate section 174A of the opening/closing member 17A may be set to a minimum required length. However, in FIG. 6, the position of the lower right end portion 17rA is set to a position that is slightly shifted to the right from the limit position. This is in consideration of a space for providing a rotation stopper mechanism, not shown, of the opening/closing member 17A. It is needless to say that the right-shifted position of the lower right end portion 17rA has to be in a range where the track QA of the lower right end portion 17rA does not interfere with the outer peripheral edge of the tool TB of the rotating tool changer magazine 12B.

As described above, in the above embodiment, the rotation axis X3A, X3B of the opening/closing member 17A, 17B is offset to a position that is diagonally upward and rightward of the rotation axis X1A, X1B of the tool changer magazine 12A, 12B. Accordingly, the lower left end portions 17lA, 17lB of the opening/closing members 17A, 17B may both be shifted to the right. As a result, the opening/closing members 17A, 17B may turn without interfering with each other, even if the gap between the main spindles 9A, 9B in the X-axis direction is smaller than a total width of the radii of the outer peripheral edge tracks OA, OB of the tools TA, TB, and thus, an installation space of the machine tool 1 may be made small in the X-axis direction.

Next, an operation in a case where the tool changer magazine 12A, 12B performs non-machining area rotation will be described with reference to FIG. 8. FIG. 8A is a diagram of a state where the tool holding section HaA, HaB is at the tool indexing/replacement position P1A, P1B of the tool storage magazine 11A, 11B. FIG. 8B is a diagram of a state where the tool holding section HbA, HbB is at the tool indexing/replacement position P1A, P1B. FIG. 8C is a diagram of a state where the tool holding section HcA, HcB is at the tool indexing/replacement position P1A, P1B. FIG. 8D is a diagram of a state where the tool holding section HdA, HdB is at the tool indexing/replacement position P1A, P1B.

In the case where the tool changer magazine 12A, 12B performs non-machining area rotation, the opening/closing member 17A, 17B maintains the opening 16a (FIG. 7) of the cover 16 in a closed state. A turning force in the clockwise direction (direction of opening the opening 16a) is possibly applied to the opening/closing member 17A, 17B by the non-machining area rotation of the tool changer magazine 12A, 12B. However, by providing biasing means (not shown) such as a spring, turning of the opening/closing member 17A, 17B and opening of the opening 16a may be prevented.

A cycle time of tool replacement between the tool changer magazine 12A, 12B and the main spindle 9A, 9B will be described, taking the tool changer magazine 12A on the machine tool 1A side as an example. FIG. 6 is a diagram in which the tool changer magazine 12A is waiting at the origin position in a state where the tool holding section HaA is empty and the tool holding sections HbA, HcA, HdA are holding the tools TA. The empty tool holding section HaA, which is to receive the tool TA that was used for machining from the main spindle 9A, is waiting at a position closest to the main spindle 9A in the non-machining area CS, and is capable of receiving the tool TA from the main spindle 9A by a smallest rotation angle (about 90 degrees), as shown in FIG. 7A. Next, as shown in FIG. 7B, in the case of transferring a tool for the next process from the tool holding section HbA to the main spindle 9A, the tool changer magazine 12A is rotated clockwise by an angle between the tool holding section HaA and the tool holding section HbA. Although depending on a tool diameter, the angle between the tool holding sections is 25 degrees in the present example. After the tool replacement, the tool changer magazine 12A may return to the origin position (FIG. 6) by rotating counterclockwise by an angle the same as an angle of clockwise rotation. When the tool changer magazine 12A returns to the origin position, the opening/closing member 17A closes the opening 16a of the cover 16, and thus, the main spindle 9A may immediately start machining. That is, compared to Patent Literature 2, the rotation angle of the tool changer magazine 12A necessary for tool replacement may be reduced by about 40% at a maximum, and the cycle time may be reduced to the extent. The same can be said for the tool changer magazine 12B on the machine tool 1B side.

Figure 8:
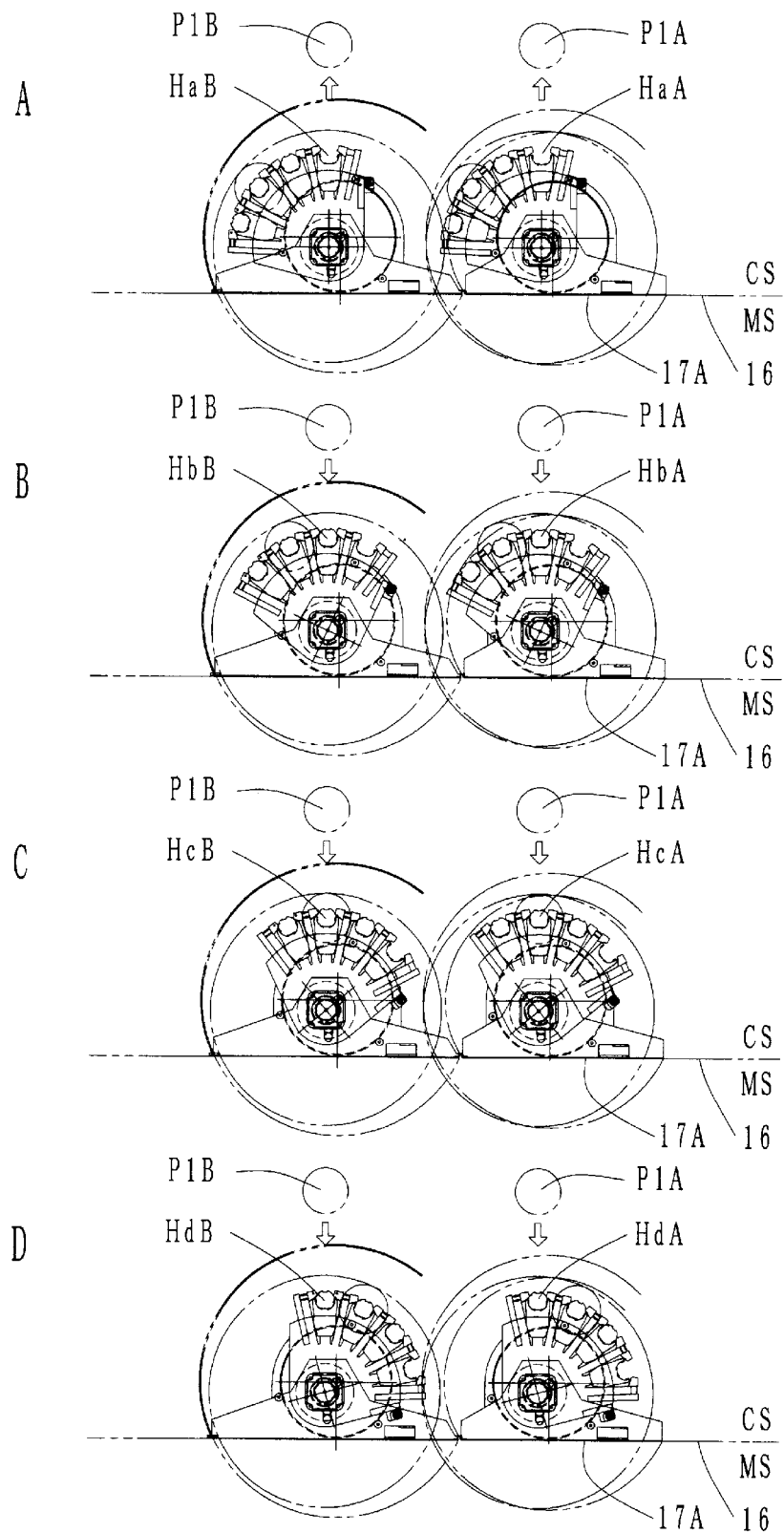
FIG. 8 is a diagram showing a case where the tool changer magazine rotates in a non-machining area.

On the other hand, as shown in FIG. 8, while the tool changer magazine 12A is performing non-machining area rotation after returning to the origin position, the opening 16a (FIG. 7) of the cover 16 is maintained in the closed state by the opening/closing member 17A. Accordingly, as long as preparation of the tool TA to be used next may be performed between the tool changer magazine 12A and the tool storage magazine 11A in parallel while machining is being performed by the main spindle, such a preparation does not affect the cycle time of tool replacement. As can be seen in FIG. 8A, also in the case of the tool changer magazine 12A rotating in the non-machining area CS, and performing transfer of a tool with respect to the tool pot swiveling section 14A (FIG. 2), the tool holding section with the greatest rotation angle is the tool holding section HaA, and its rotation angle is about 90 degrees. After transferring a tool received from the main spindle 9A to the tool pot swiveling section 14A and becoming empty, the tool holding section HbB receives a new tool from the tool pot swiveling section 14A, as shown in FIG. 8B. Preparation for next tool replacement with the main spindle 9A is performed in this manner. However, in a case where a machining time of the main spindle 9A is extremely short, and a time required for a preparation operation is longer, the cycle time for tool replacement is increased by the preparation time.

In light of the above, in the case where the machining time after the main spindle 9A receives a tool from the tool holding section HbA is extremely short, it is preferable that the tool changer magazine 12A does not perform transfer of a tool as the preparation operation with respect to the tool storage magazine 11A, and the tool holding section HbA that has most recently transferred a tool to the main spindle 9A and become empty receives a tool from the main spindle 9A, and the tool in the tool holding section HcA is transferred to the main spindle 9A, as shown in FIG. 7C. With this, the time taken for the preparation operation becomes unnecessary, and tool replacement may be swiftly performed when machining by the main spindle 9A is finished, and thus, a loss is not caused in the cycle time, and the cycle time may be prevented from becoming long. Furthermore, the tool holding section HcA may receive a tool from the main spindle 9A after transferring a tool to the main spindle 9A and becoming empty, and the tool in the tool holding section HdA may be transferred to the main spindle 9A, as shown in FIG. 7D. That is, it is possible to cause at least one of four tool holding sections HaA to HdA of the tool changer magazine 12A to be empty, and to cause three tools to be held at a maximum. An arbitrary program may be written regarding to which tool holding section among the tool holding sections HaA, HbA, HcA, HdA the main spindle 9A is to transfer a tool, and from which tool holding section among the tool holding sections HaA, HbA, HcA, HdA the main spindle 9A is to receive a tool, in relation to the machining time of the main spindle 9A. Furthermore, with respect to the number of tool holding sections HA, at least two tool holding sections are necessary, but the number of tool holding sections does not have to be four as in the present example, and the number of tool holding sections may be three or five, for example.

Figure 9:
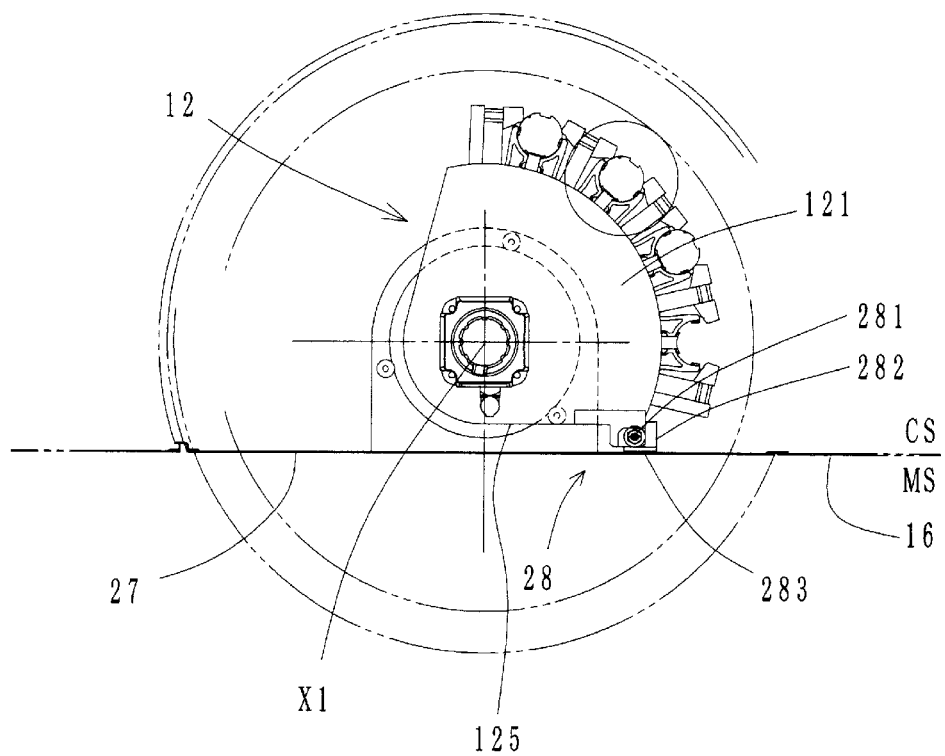
FIG. 9 is a front view of main sections according to a second embodiment of the present invention.

Next, a second embodiment of the present invention will be described with reference to FIG. 9. In FIG. 9, same reference signs are used for sections that are the same as those of the first embodiment described above. The machine tool of the first embodiment includes two main spindles, but a machine tool of the second embodiment includes one main spindle. FIG. 9 shows a tool changer magazine 12 and an opening/closing member 27, which are main sections of the second embodiment. In the case where there is one main spindle, the tool changer magazine 12 and the opening/closing member 27 may have a coaxial rotation axis X1. A reference sign 28 is switching means for switching between synchronization/asynchronization of the opening/closing member 27 with rotation of the tool changer magazine 12. The switching means 28 includes a pressing body section 281 fixed to a side section 125 of a disc body 121, and a pressed body section 282 fixed to the opening/closing member 27. The pressed body section 282 is a member which is formed into an L shape in a side view, and its bottom side section 283 is an electromagnet. At the time of the tool changer magazine 12 rotating clockwise in the machining area MS, the opening/closing member 27 turns integrally with the tool changer magazine 12 by receiving a force of the pressing body section 281 pressing the bottom side section 283 of the pressed body section 282, and the opening of the cover 16 is thereby opened. Moreover, at the time of the tool changer magazine 12 rotating counterclockwise in the machining area MS and returning to the origin position, the electromagnet of the bottom side section 283 is energized, and the pressing body section 281 comes into contact with the bottom side section 283 due to an attractive force of the electromagnet, and thus, the opening/closing member 27 turns counterclockwise integrally with the tool changer magazine 12, and closes the opening of the cover 16. On the other hand, at the time of the tool changer magazine 12 rotating clockwise and counterclockwise in the non-machining area, the electromagnet of the bottom side section 283 is not energized, and a state is maintained where the opening of the cover 16 is closed by the opening/closing member 27. In this case, the bottom side section 283 of the pressed body section 282 is the electromagnet, but the pressing body section 281 may be the electromagnet instead. Furthermore, the opening/closing member 27 may close the opening of the cover 16 by using biasing means such as a spring, instead of the electromagnet, and so the switching means 28 is not limited to the means described above.

Figure 10:
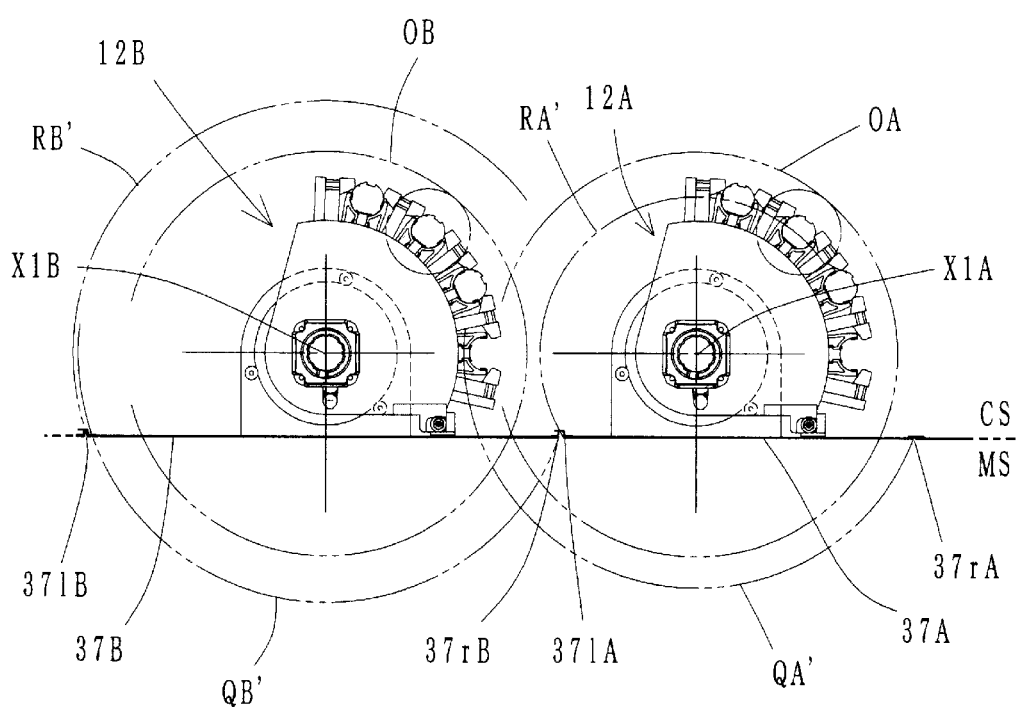
FIG. 10 is a front view of main sections according to a third embodiment of the present invention.

Next, a third embodiment of the present invention will be described with reference to FIG. 10. Also in FIG. 10, same reference signs are used for sections that are the same as those of the first embodiment described above. A machine tool of the third embodiment includes two main spindles. FIG. 10 shows the tool changer magazines 12A, 12B, and opening/closing members 37A, 37B, which are main sections of the third embodiment. A rotation axis of the opening/closing member 37A, 37B is coaxial with the rotation axis X1A, X1B of the tool changer magazine 12A, 12B. In this case, a gap between the two main spindles in the X-axis direction cannot be made smaller than the total of the radii of the tracks OA, OB where the outer peripheral edges of tools held by the tool holding sections move. In this embodiment, a position of a lower right end portion 37rB of the opening/closing member 37B is determined when a position of a lower left end portion 37lA of the opening/closing member 37A is set to a position that does not interfere with the track OA. Then, when a track QB' of the lower right end portion 37rB of the opening/closing member 37B is determined, the position of the lower left end portion 37lB of the opening/closing member 37B is also determined. FIG. 10 shows an example where a left-right width of each of the opening/closing members 37A, 37B is made the smallest, but unlike in the first embodiment, the rotation axes of the opening/closing members 37A, 37B are coaxial with the rotation axes X1A, X1B of the tool changer magazines 12A, 12B, and thus, the lower left end portion 37lB of the opening/closing member 37B does not come close to the track OB where the outer peripheral edge of a tool held by the tool holding section HB moves. Accordingly, the left-right width of the opening/closing member 37B is increased to the extent of separation of the lower left end portion 37lB from the track OB. In the case where there is no restriction regarding a left-right width of the machine tool, the left-right width of the opening/closing member 37B may be determined according the gap between the main spindles in the X-axis direction.

Next, a fourth embodiment of the present invention will be described with reference to FIG. 11. In each of the embodiments described above, an example is cited where the tool changer magazine 12A, 12B rotates clockwise from the origin position in FIG. 6 when performing tool replacement between the tool changer magazine 12A, 12B and the main spindle 9A, 9B. However, depending on a holding state of a tool in the tool holding section HA, HB of the tool changer magazine 12A, 12B, the cycle time may be more reduced by causing the tool changer magazine 12A, 12B to rotate counterclockwise than by causing the tool changer magazine 12A, 12B to rotate clockwise.

Figure 11:
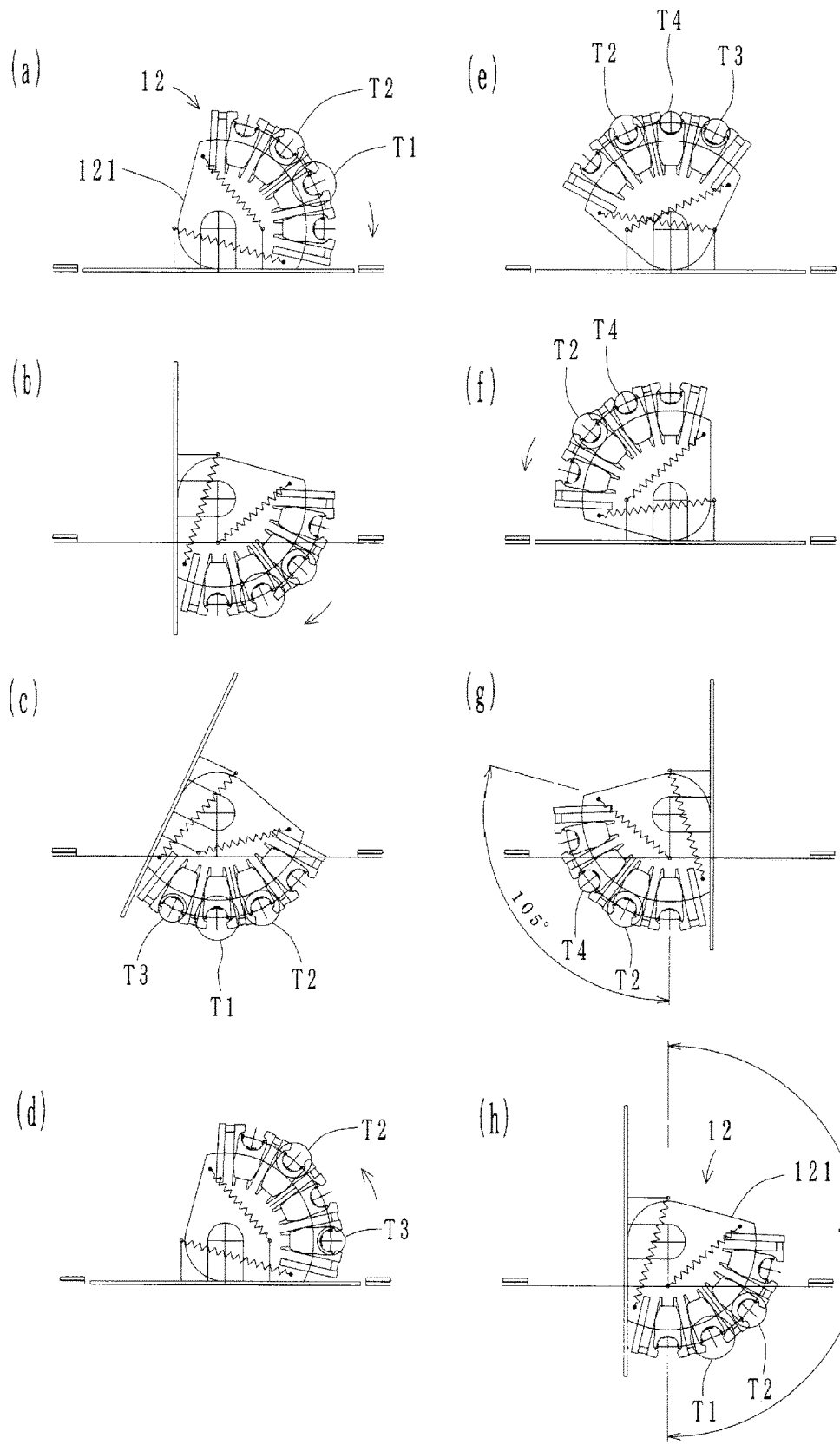
FIG. 11 is a diagram describing an operation in a fourth embodiment of the present invention.

For example, in FIG. 11, after rotating clockwise from the origin position in (a) and reaching the position in (b) to perform tool replacement with respect to the main spindle (not shown), the tool changer magazine 12 stops at this position, and a tool after use that is attached to the main spindle is transferred to the tool changer magazine 12. Then, the tool changer magazine 12 further rotates while holding a tool T3 received from the main spindle in the manner shown in (c), and stops at this position and transfers a tool T1 for replacement to the main spindle. After performing tool replacement in the manner described above, the tool changer magazine 12 rotates counterclockwise in the manner shown in (d), and stops at the position in (e). Then, at this position, the tool holding section which transferred the tool T1 to the main spindle and became empty receives a next tool T4 for replacement from the tool storage magazine (not shown). After this, the tool changer magazine 12 rotates counterclockwise in the manner shown in (f), stops at this position, and returns the tool T3 received from the main spindle to the tool storage magazine. Then, the tool changer magazine 12 further rotates counterclockwise to the position in (g). Finally, at this position, a tool after use attached to the main spindle is transferred to the tool changer magazine 12.

In the example in FIG. 11, of the four tool holding sections provided at the tool changer magazine 12, two on both ends are for receiving used tools. Accordingly, in the case where the tool changer magazine 12 is to rotate from the origin position in (a) to receive a used tool at the main spindle, a time until tool replacement is reduced when the rotation is performed clockwise as shown in (b). On the other hand, in the case where the tool changer magazine 12 is to rotate from the position in (f) to receive a used tool at the main spindle, if the tool changer magazine 12 is rotated clockwise, the rotation angle is 180 degrees, as shown in (h), and thus the time until tool replacement is long. However, when the tool changer magazine 12 rotates counterclockwise from the position in (f), as in the present embodiment, the rotation angle is 105 degrees, as shown in (g), and thus the time until tool replacement is reduced. Whether the tool changer magazine 12 is to be rotated clockwise or counterclockwise is determined by a microcomputer provided at the machine tool 1, based on information such as a rotation position of the tool changer magazine 12, presence/absence of a tool in each tool holding section, and the like. Then, based on the result, a motor for rotating the tool changer magazine 12 rotates by a predetermined angle in a predetermined direction.

FIG. 11 shows a case where there is one main spindle, but rotation control as shown in FIG. 11 may be performed also in a case where there are two main spindles. According to this rotation control, two tool changer magazines corresponding to respective main spindles may rotate in a same direction (two-spindle same-direction rotation), or one of the two tool changer magazines may rotate in a direction opposite that of the other tool changer magazine (two-spindle opposite-direction rotation).

Figure 14:
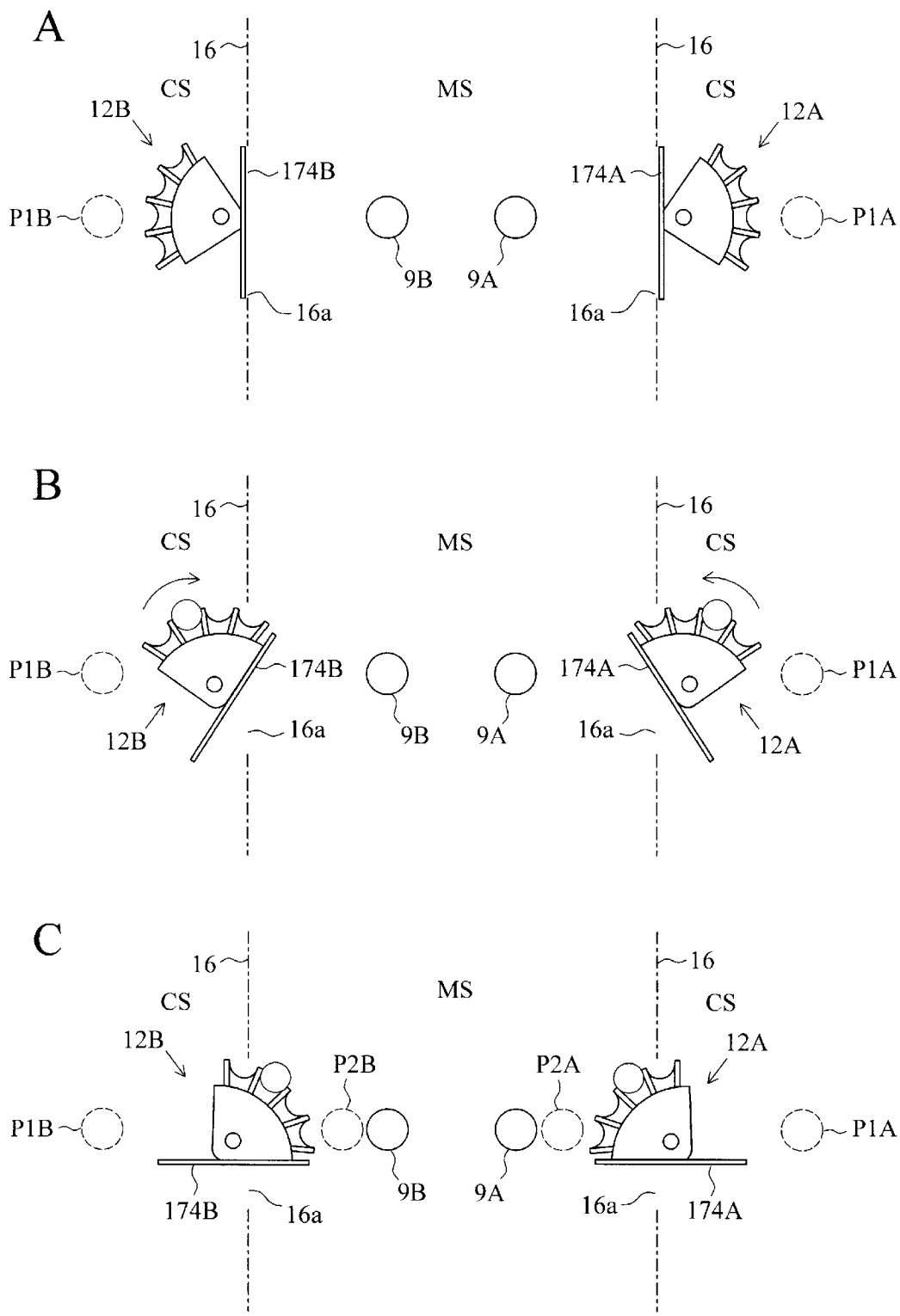
FIG. 14 is a schematic diagram showing a fifth embodiment of the present invention.

In each embodiment described above, an example is cited where the tool storage magazine 11A, 11B and the tool changer magazine 12A, 12B of the machine tool are disposed above the main spindle 9A, 9B, as shown in FIG. 2, but the present invention is also applicable to a machine tool having the tool storage magazine and the tool changer magazine disposed at a side of the main spindle. FIG. 14 is a schematic diagram showing a fifth embodiment for such a case.

In FIG. 14, the tool changer magazine 12A, 12B is disposed at a side of the respective main spindle 9A, 9B, and the tool changer magazine 12A, 12B performs transfer of a tool with respect to the tool storage magazine (not shown) which is also disposed at the side. The opening 16a for allowing tool replacement between the tool changer magazine 12A, 12B and the main spindle 9A, 9B is provided at the cover 16, on each of left and right, for partitioning the machining area MS and the non-machining area CS, in a manner corresponding to the main spindle 9A, 9B. In FIG. 14, illustration of the opening/closing members 17A, 17B (FIG. 4, etc.) is omitted, and only the plate sections 174A, 174B of the opening/closing members are shown.

FIG. 14A shows a case where the tool changer magazine 12A, 12B receives a new tool from the tool storage magazine at the tool indexing/replacement position P1A, P1B. At this time, the plate section 174A, 174B of the opening/closing member takes the vertical posture, and closes the opening 16a of the respective cover 16.

FIG. 14B shows the tool changer magazine 12A, 12B rotating in an arrow direction to receive a used tool from the main spindle 9A, 9B, and the plate section 174A, 174B of the opening/closing member being changed from the vertical posture to the inclined posture in synchronization with the rotation. At this time, the opening 16a of the respective cover 16 is opened as the plate section 174A, 174B becomes inclined.

FIG. 14C shows a case where the tool changer magazine 12A, 12B further rotates, and receives a used tool from the main spindle 9A, 9B at the tool indexing/replacement position P2A, P2B. At this time, the plate section 174A, 174B is changed to the horizontal posture, and the opening 16a of the respective cover 16 is opened.

Figure 15:
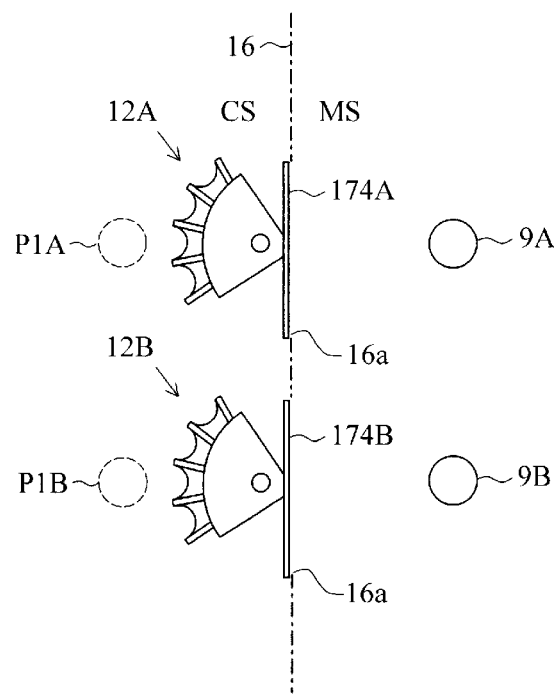
FIG. 15 is a schematic diagram showing an example modification of the fifth embodiment.
Figure 16:
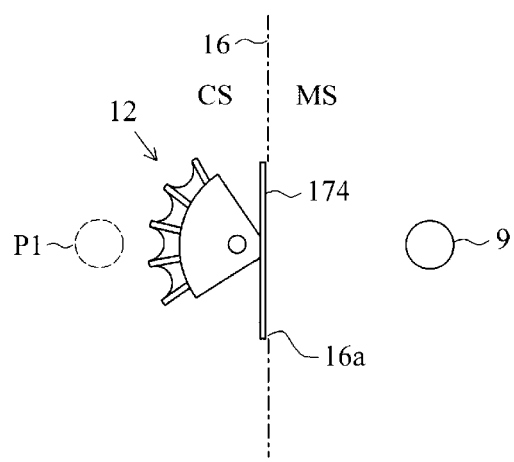
FIG. 16 is a schematic diagram showing another example modification of the fifth embodiment.

In FIG. 14, the two main spindles 9A, 9B are arranged in a horizontal direction, but the two main spindles 9A, 9B may be arranged in a vertical direction, as shown in FIG. 15, and the tool changer magazines 12A, 12B may be disposed on a same side with respect to the main spindles 9A, 9B. Furthermore, as shown in FIG. 16, it is possible to provide one main spindle 9, and one tool changer magazine 12 including the plate section 174.

REFERENCE SIGNS LIST 1, 1A, 1B machine tool
9A, 9B main spindle
100A, 100B automatic tool changer
11A, 11B tool storage magazine
12A, 12B tool changer magazine
16 cover
16a opening
17A, 17B opening/closing member
18A, 18B cam mechanism (switching means)
174A, 174B plate section
176A, 176B plate section
181A, 181B cam follower (pressing body section)
181r roller
181s shaft
183A, 183B groove body (pressed body section)
184A, 184B cut-away section
185A, 185B groove
X1A, X1B rotation axis of tool changer magazine
X3A, X3B rotation axis of opening/closing member

The invention claimed is:

1. An automatic tool changer comprising:
a tool storage magazine that stores a tool to be attached to a main spindle of a machine tool;
a tool changer magazine that rotates about a tool changer magazine rotation axis, the tool changer magazine being rotatable such that a tool holding section thereof is moved into a first tool indexing and replacement position for tool transfer between the main spindle and the tool holding section, and the tool changer magazine further being rotatable such that the tool holding section thereof is moved into a second tool indexing and replacement position for tool transfer between the tool storage magazine and the tool holding section;
a cover that partitions a machining area where the tool changer magazine engages in the tool transfer with the main spindle, and a non-machining area where the tool changer magazine engages in the tool transfer with the tool storage magazine;
an opening, disposed in the cover, that enables transfer of the tool between the tool changer magazine and the main spindle; and
an opening and closing member that opens and closes the opening by rotating about an opening and closing member rotation axis in synchronization with rotation of the tool changer magazine about the tool changer magazine rotation axis, wherein
the opening and closing member comprises a plate section that partitions the machining area and the non-machining area at a position of the opening,
the plate section closes the opening by taking a horizontal posture or a vertical posture, in a case where the tool changer magazine engages in the tool transfer with the tool storage magazine,
the plate section opens the opening by changing a posture from the horizontal posture to an inclined posture or the vertical posture, or from the vertical posture to the inclined posture or the horizontal posture, in a case where the tool changer magazine engages in the tool transfer with the main spindle,
in the case where the tool changer magazine engages in the tool transfer with the main spindle, the plate section rotates integrally with the tool changer magazine when the posture of the plate section is being changed such that the opening is opened, and
in the case where the tool changer magazine engages in the tool transfer with the tool storage magazine, the tool changer magazine rotates with respect to the plate section while the opening remains closed by the plate section.

2. The automatic tool changer according to claim 1, further comprising a switch that switches between asynchronization and the synchronization of the opening and closing member with respect to rotation of the tool changer magazine.

3. The automatic tool changer according to claim 2, wherein
the switch comprises a pressing body section fixed to the tool changer magazine, and a pressed body section fixed to the opening and closing member,
the pressing body section comes into contact with the pressed body section, and the opening and closing member turns integrally with the tool changer magazine in the case where the tool changer magazine engages in the tool transfer with the main spindle, and the pressing body section separates from the pressed body section, and only the tool changer magazine rotates and the opening and closing member does not turn, in the case where the tool changer magazine engages in the tool transfer with the tool storage magazine.

4. The automatic tool changer according to claim 3, wherein the pressing body section is a cam follower comprising a roller and a shaft, the pressed body section is a groove body comprising a groove where the cam follower is guided, a cut-away section allowing the cam follower to move in and out of is provided on a portion of the groove body, the cam follower moves in from the cut-away section and comes into contact with the groove body in the case where the tool changer magazine engages in the tool transfer with the main spindle, and the cam follower is separated from the cut-away section and contact between the cam follower and the groove body is released in the case where the tool changer magazine engages in the tool transfer with the tool storage magazine.

5. The automatic tool changer according to claim 3, wherein one of the pressing body section and the pressed body section comprises an electromagnet, and the pressing body section and the pressed body section come into contact with each other by an attractive force of the electromagnet.

6. The automatic tool changer according to claim 1, wherein the tool changer magazine rotation axis and the opening and closing member rotation axis are offset from each other.

* * * * *